No. 685,540. Patented Oct. 29, 1901.
A. THOMPSON.
STEERING MECHANISM FOR VEHICLES.
(Application filed Feb. 28, 1901.)
(No Model.)
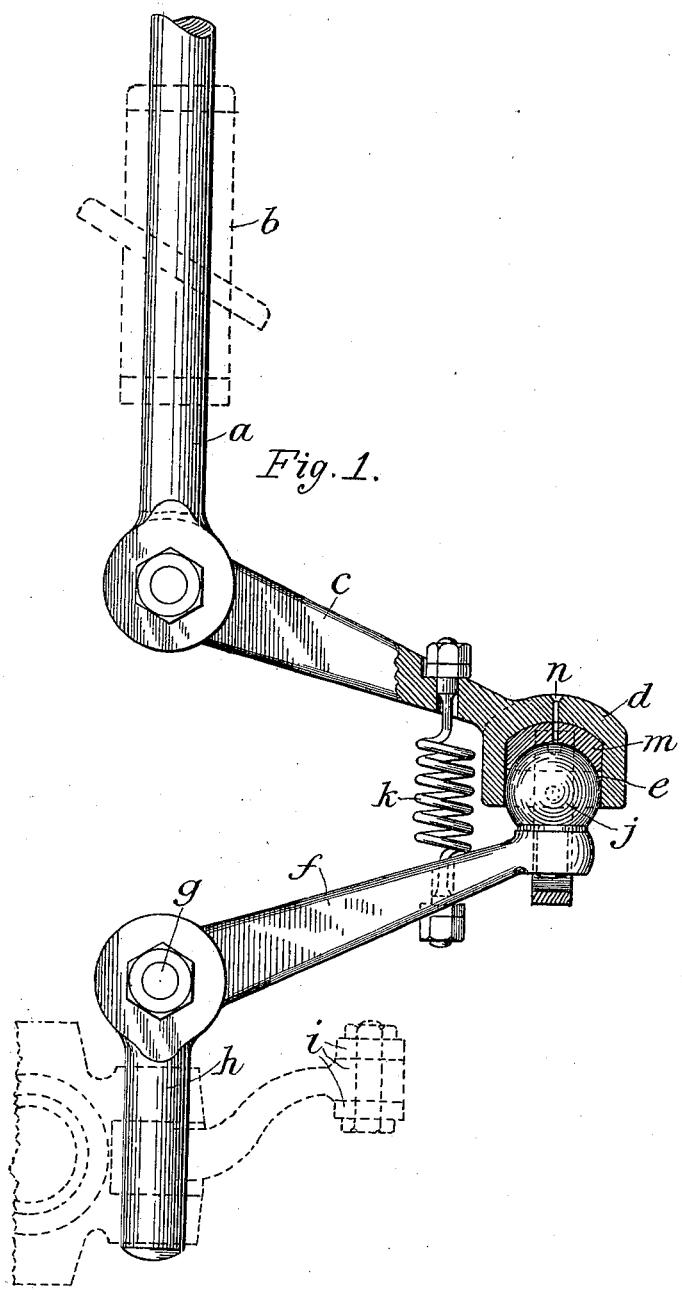
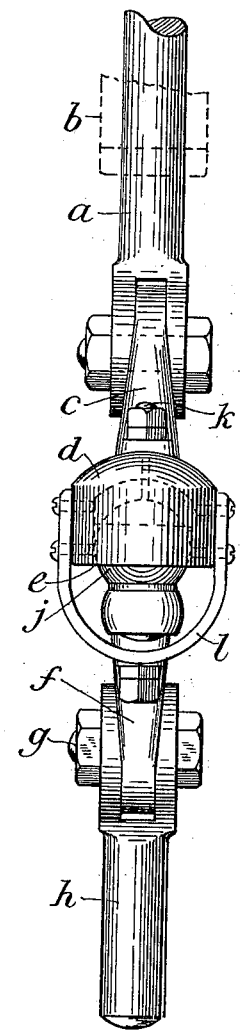
WITNESSES:
INVENTOR.
Alfred Thompson.
BY Redding, Kiddle & Greeley
ATTYS.

UNITED STATES PATENT OFFICE.

ALFRED THOMPSON, OF GENEVA, OHIO, ASSIGNOR TO AMERICAN BICYCLE COMPANY, OF JERSEY CITY, NEW JERSEY, AND NEW YORK, N. Y., A CORPORATION OF NEW JERSEY.

STEERING MECHANISM FOR VEHICLES.

SPECIFICATION forming part of Letters Patent No. 685,540, dated October 29, 1901.

Application filed February 28, 1901. Serial No. 49,279. (No model.)

*To all whom it may concern:*

Be it known that I, ALFRED THOMPSON, a citizen of the United States, residing in Geneva, in the State of Ohio, have invented certain new and useful Improvements in Steering Mechanism for Vehicles, of which the following is a specification.

The object of this invention is to lessen and to prevent as far as possible the vibration of the steering post and handle of a self-propelled vehicle that is caused by the motion of the vehicle and the uneven surface of the roadway over which it passes; and the invention consists, essentially, in providing a yielding connection between the steering handle or post and the steering-gear of the vehicle and in the other new and novel features of construction and combinations of parts hereinafter set forth and claimed.

In the accompanying drawings, Figure 1 represents a side elevation of a portion of the steering-gear and the steering-post of a vehicle, showing the connection between same, the bearing for the steering-post and the steering-gear being shown in dotted lines. Fig. 2 represents an end view of the construction shown in Fig. 1.

The steering-post $a$ is rotatable in bearings $b$ and is rotated in the usual manner by a steering-handle. (Not shown.) At its lower end the steering-post is provided with a pivoted arm or lever $c$, that projects downwardly and preferably is provided at its end with an enlargement $d$, recessed to form a ball-socket $e$.

The steering-gear comprises an arm or lever $f$, that is pivoted at $g$ to a stud $h$, connected with a steering-linkage $i$, which may be of any well-known construction. Said lever projects upwardly and is provided at or near its end with a ball $j$, that engages in the socket $e$. The ball and socket are yieldingly held in engagement by a spring $k$, arranged between the levers, and are held against complete separation by a yoke $l$. The socket is provided with a packing $m$ of any suitable material to prevent rattling, and may also be provided with a duct or opening $n$, whereby the joint may be lubricated. It will be noticed that in this construction the steering-post is detachably connected with the steering-gear and is held from complete disengagement only by the spring and the yoke. Preferably the spring is of sufficient strength to hold the parts together and the yoke is added merely to provide against accident. As the socket is inverted, the accumulation of dust and dirt in the joint is prevented by the movement of the ball in the socket, so that little, if any, lubrication is required.

I claim as my invention—

1. In a vehicle, the combination with the steering-gear, of a steering-post for actuating the steering-gear and detachably connected therewith, and elastic means for holding said post and gear in engagement, substantially as described.

2. In a vehicle, the combination of steering-gear comprising a lever, a steering-post provided with a lever, a ball on one of said levers engaging in the socket in the other lever, and means for yieldingly holding said ball and socket in engagement, substantially as described.

3. In a vehicle, the combination with a steering-post, a lever pivoted to said post having a socket provided therein, a steering-gear comprising a lever having a ball engaging in said socket, a spring to hold the ball and socket yieldingly in engagement and means to prevent complete separation of said ball and socket, substantially as described.

4. In a vehicle, the combination with a steering-post, a lever pivoted to said post having a socket provided therein, and a packing in said socket, of a steering-gear comprising a lever, a ball on the lever engaging in said socket, a spring to hold said ball and socket yieldingly in engagement, and a yoke to prevent complete separation of said ball and socket, substantially as described.

In testimony whereof I sign this application, in the presence of two witnesses, this 19th day of February, 1901.

ALFRED THOMPSON.

Witnesses:
 HENRY MEANS,
 O. B. CLARK.